(No Model.)
L. D. HOSFORD.
TRAP.
No. 598,992. Patented Feb. 15, 1898.
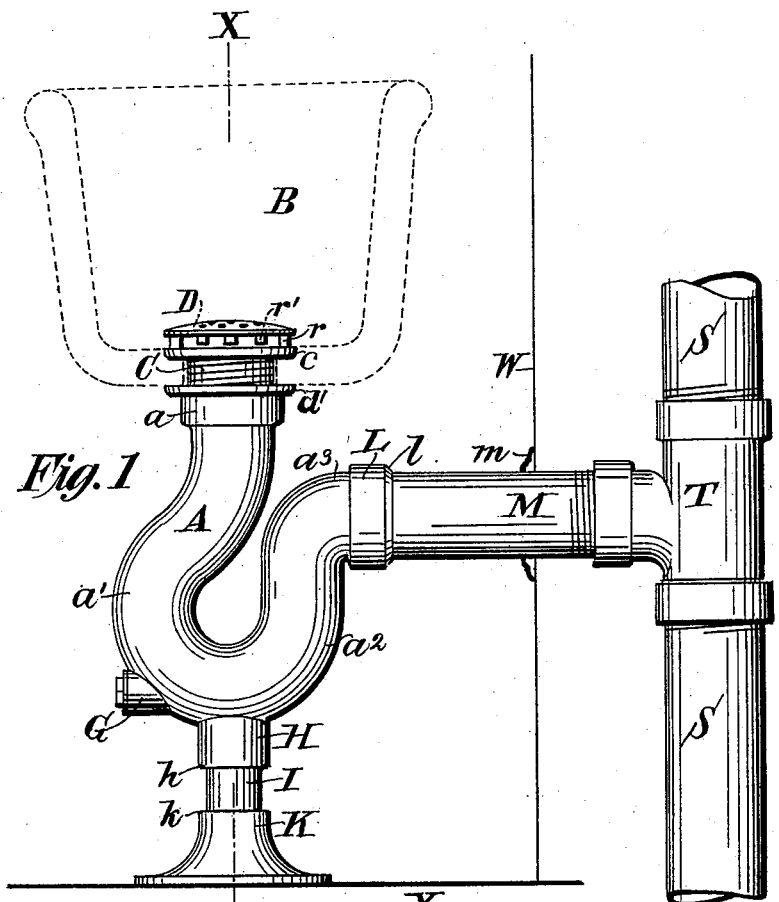
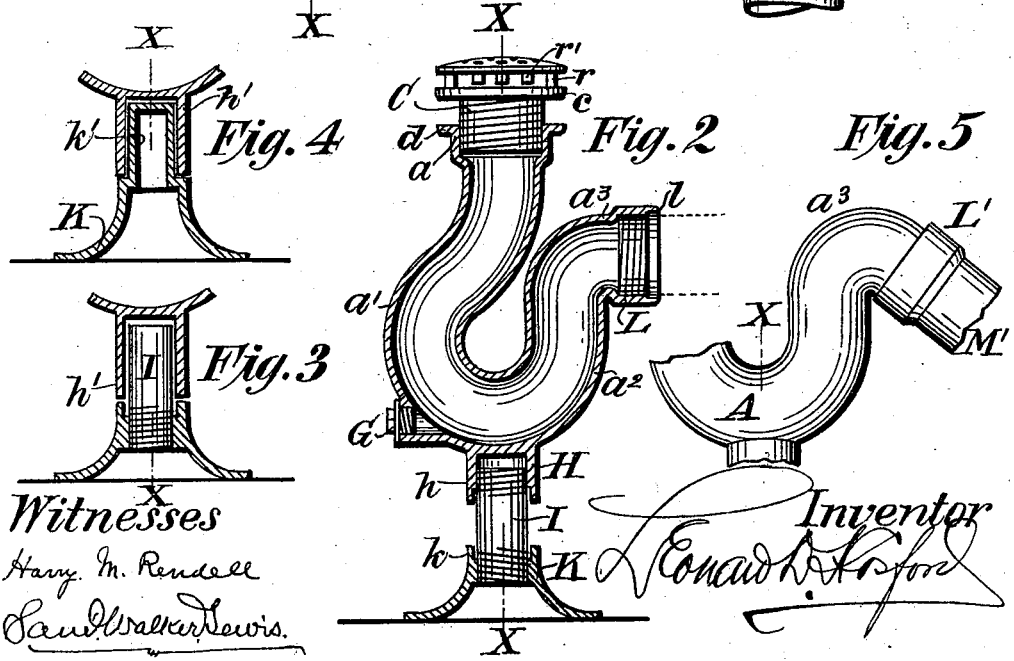
Witnesses
Harry M. Rendell
Sam'l Walker Lewis
Inventor
Leonard D. Hosford

UNITED STATES PATENT OFFICE.

LEONARD D. HOSFORD, OF BROOKLYN, NEW YORK.

TRAP.

SPECIFICATION forming part of Letters Patent No. 598,992, dated February 15, 1898.

Application filed July 9, 1897. Serial No. 643,953. (No model.)

*To all whom it may concern:*

Be it known that I, LEONARD D. HOSFORD, a citizen of the United States, residing at Brooklyn, in the county of Kings and State of New York, have invented certain new and useful Improvements in Traps, of which the following is a specification.

My invention relates to and consists in so constructing and forming my trap whereby it is adjustable vertically or horizontally and also constitutes a perfectly-balanced pedestal or support for the receptacle used with it, as illustrated in the accompanying drawings.

Figure 1 is a vertical longitudinal view illustrating my improved trap supporting a slop-hopper and adjustable, as shown, to the soil or sewer pipes. Fig. 2 is a vertical longitudinal section of the same to further illustrate the construction. Figs. 3, 4, and 5 are views to illustrate certain details of construction, as hereinafter set forth.

The same letters of reference indicate identical parts in all the views.

In modern plumbing practice, especially in large fireproof structures, all available space is economized. The soil-piping is of wrought-iron, steel, or other metal connected by screwed joints. There is no space within the thickness of floors to run horizontal piping, and it is often a difficult matter to connect the trapped fixtures—such as closets, slop-hoppers, &c.—to the soil-pipes in a manner to combine symmetry and strict sanitary construction at an economical cost of labor, much time being taken up in adjustments and making such connections. By my invention much time in labor and expense of preparation can be saved by ease of adjustment, as it practically conforms to and meets any structural condition that may arise. Symmetry is also preserved, and the construction or form of my trap constitutes a perfect self-balanced support for any receptacle that may be placed upon it without the necessity of using stays or bolts of any kind.

The main body of my trap A is provided with a vertical hub $a$ and flange $d$, into which is screwed the sleeve C, having flange $c$ and posts or stanchions $r$, which latter support a strainer D slightly above the flange $c$. Between said posts, depending from the strainer D, are located a number of fingers or guards $r'$, the lower ends of which are slightly above the face of flange $c$, whereby fibrous substances can wash by said guard-fingers, while large solids will be retained and the trap thus protected from accumulations that might otherwise tend to choke it.

A slop-hopper or other receptacle B (shown by dotted lines) may be secured between the flanges $c$ and $d$ by screwing the sleeve C tightly within the hub $a$. Below the hub $a$ my trap curves downward and outward at $a'$, crosses the line of its axis $x$ $x$, and, curving upward and outward at $a^2$ $a^3$, preferably terminates in a hub L, which may be horizontal, as in Fig. 1, or at any angle, as in Fig. 5. A horizontal pipe M, passing into the wall W, connects the trap by screw-threads to the T of the soil-pipe S, the aperture in the wall being covered by the usual scutcheon $m$ and the screw-thread of the pipe M being covered by the hood or lip $l$ on the outer edge of the hub L, as shown in Fig. 2.

A supporting leg or member H is provided on the line of axis $x$ $x$, to which in some cases is screwed or fitted a nipple or axis I, the lower end of which is adapted to engage a base K by screw-threads or otherwise, hoods or lips $h$ and $k$ being provided to cover the threads when the nipple or axis I is employed and connected to the supporting member and base by screw-threads. The threads on the nipple or axis I may be both right-hand threads, or one may be right hand and the other left hand, whereby by simply turning or revolving the axis-nipple I the trap can be raised or lowered as desired.

In Fig. 3 the axis-nipple I is screwed only to the base K within the annular hood $k$, the hub H being lengthened and made of a size to slip down or telescope over the axis-nipple I, as at $h'$. If preferred, this construction could be reversed by screwing one end of the axis I into the hub H and the lower end be telescoped snugly into the base K.

In Fig. 4 the base K is extended upward at K' to form the axis, and the hub H is telescoped closely over it, as shown at $h'$. This construction can also be reversed by arranging the base K to telescope over the supporting member H.

In the two last forms described, to make vertical adjustment, it would only be necessary to cut off the ends $h'$ and $k'$ at the desired length to bring the parts together at the proper height, after which the trap can be rotated on its axis to the right angle for connection with the soil-pipe, horizontal adjustment being made by the connecting-nipple M.

My trap is preferably provided with the usual trap-screw clean-out G, and it will be observed that the center of the hub $a$ and sleeve C corresponds to the line of axis $x\,x$, the curvature at $a'$ serving as a balance to the hub projection at L. Furthermore, this form makes it unnecessary to bolt down the flange K. Hence when making final connection, as described, it can be moved horizontally, laterally, raised or lowered, or revolved upon its axis to any desired angle, and in illustrating the examples or modifications described I have merely indicated some of the forms or ways which occur to me as adaptable to the object sought and within the scope of my invention.

Having described my invention, I claim—

1. The trap A having balance-curvatures $a'$ $a^2$, base K, a supporting-axis vertically adjustable and revoluble upon said base, flange $d$, sleeve C and flange $c$, the center of said sleeve corresponding to the center line of said axis, whereby the trap will be in balance and can be raised or lowered or revolved upon said axis to connect to the soil or waste pipe, substantially as described.

2. The trap A having flange $d$ and curvatures $a'$ $a^2$ $a^3$, base K, a supporting and vertically-adjustable axis rotatable on said base, sleeve C provided with flange $c$ and a suitable strainer, the center of said sleeve and its strainer corresponding to the line of axis, whereby the trap will be balanced and adjustable vertically and horizontally to connect with the soil or waste pipe, substantially as described.

LEONARD D. HOSFORD.

Witnesses:
    HARRY M. RENDEE,
    SAML. WALKER LEWIS.